United States Patent [19]

Susman

[11] 4,069,204
[45] Jan. 17, 1978

[54] POLYCHLORINATED BENZENE DIAMINES AS CURING AGENTS FOR EPOXY RESINS

[75] Inventor: Samuel Eugene Susman, Norwalk, Conn.

[73] Assignee: American Cyanamid Company, Stamford, Conn.

[21] Appl. No.: 693,581

[22] Filed: June 7, 1976

[51] Int. Cl.$^2$ ............................................. C08G 59/50
[52] U.S. Cl. ............................. 260/47 EN; 260/2 N; 260/59 EP; 260/37 EP; 260/830 TW; 428/413
[58] Field of Search ............ 260/47 EN, 2 N, 59 EP

[56] References Cited
U.S. PATENT DOCUMENTS

| | | | |
|---|---|---|---|
| 2,891,927 | 6/1959 | Philipson | 260/47 |
| 3,155,743 | 11/1964 | Newey | 260/836 |
| 3,297,758 | 1/1967 | Hoeschle et al. | 260/570 |
| 3,308,158 | 3/1967 | Szobel et al. | 260/570.5 |
| 3,761,446 | 9/1973 | Soldatos | 260/47 EN |

*Primary Examiner*—Harold D. Anderson
*Assistant Examiner*—E. A. Nielsen
*Attorney, Agent, or Firm*—John L. Sullivan; Charles F. Costello, Jr.

[57] ABSTRACT

The invention has now been made that polychlorinated 1,3- and 1,4-benzene diamines produce cured epoxy resins with better moisture resistance, and higher glass transition temperatures on exposure to high humidity, than known aromatic diamine curing agents. The resulting cured epoxy resins are useful in fibrous composites, structural adhesives and coatings, where high heat distortion and good moisture resistance is desired.

8 Claims, No Drawings

POLYCHLORINATED BENZENE DIAMINES AS CURING AGENTS FOR EPOXY RESINS

BACKGROUND OF THE INVENTION

The following invention relates to the use of chlorinated benzene diamine. Specifically, the present invention relates to the curing of epoxy resins, for example, diglycidyl ether of bisphenol A and its homologs by the use of these compounds.

The cross-linking of epoxy resins, which is generally known as curing, is accomplished by the reaction of epoxy groups with active hydrogen-containing acids and bases. These hydrogen-containing acids and bases are generally provided by two classes of curing agents. These are amines which act as chain extenders, and acid curing agents which may act as esterification and etherification agents.

The use of amines as curing agents could include both primary and secondary aliphatic and aromatic amines. Aliphatic or aromatic tertiary amines have not been found useful as curing agents because they do not contain acidic hydrogen atoms and will therefore produce only homopolymerization.

The aliphatic and aromatic primary and secondary amines have been preferred to the acid curing agents, and specifically to the acid anhydrides for higher temperature work from the standpoint of chemical resistance. See, for example, *Epoxy Resins* H. Lee and K. Neville, McGraw-Hill, N.Y., 1957, page 100.

Because they provide a significant increase in the heat distortion temperature of the cured resin system, the use of aromatic amines and specifically aromatic diamines should be preferred over the aliphatic amines. This is because the stable benzene ring is tightly cross-linked into the cured structure. And if a diamine is used, it also may become a part of the epoxy backbone. As a result, certain aromatic diamines provide heat distortion temperatures 40°-60° C. higher than those obtained with even the most thoroughly post-cured aliphatic amines. However, with the exception of m-phenylene diamine, 4,4' methylene dianiline, and diamino diphenyl sulfone, other aromatic diamines have not shown any economic advantage over primary and secondary aliphatic amines. Their use has also been limited by their relatively high toxicity. See *HANDBOOK OF EPOXY RESINS*, H. Lee and K. Neville, McGraw-Hill, N.Y., 1967, pages 8-10 to 8-12.

SUMMARY OF THE INVENTION

The invention has now been made that certain chlorinated aromatic diamines produce cured epoxy resins with better moisture resistance, and better glass transition temperatures on exposure to high humidity than presently known aromatic diamine curing agents. Specifically, the invention has now been made that di, tri or tetra chlorinated 1,3- or 1,4-benzene diamine have produced cured epoxy resins with excellent moisture resistance and high glass transition temperature after exposure to high humidity.

The following dichlorinated 1,3- and 1,4-benzene diamines could be used: 3,5-dichloro, 1,4-benzene diamine; 3,6-dichloro, 1,4-benzene diamine; 5,6-dichloro, 1,4-benzene diamine; 2,4-dichloro, 1,3-benzene diamine; 2,5-dichloro, 1,3-benzene diamine; 2,6-dichloro, 1,3-benzene diamine; 4,5-dichloro, 1,3-benzene diamine; and 5,6-dichloro, 1,3-benzene diamine.

Also useful as curing agents to maintain the moisture resistance and high glass transition temperature after exposure to high humidity of cured epoxide resins are the following trichloro 1,3- and 1,4-benzene diamines: 2,3,6-trichloro, 1,4-benzene diamine; 3,5,6-trichloro, 1,4-benzene diamine; 2,4,5-trichloro, 1,3-benzene diamine; 2,5,6-trichloro, 1,3-benzene diamine; and 4,5,6-trichloro, 1,3-benzene diamine.

Also useful as curing agents for epoxide resins to maintain their moisture resistance and high glass transition temperature after exposure to high humidity are 2,3,5,6-tetrachloro, 1,4-benzene diamine and 2,4,5,6-tetrachloro, 1,3-benzene diamine.

Other chlorinated 1,3- and 1,4-benzene diamines I have found useful as curing agents for epoxide resins to maintain their moisture resistance and high glass transition temperature after exposure to high humidity are disclosed in the examples.

The use of the above-described curing agents and the resulting cured epoxy resin should be useful in fibrous composites, structural adhesives, and moisture resistant coatings and castings. As a structural adhesive, the resulting cured epoxy resin could be used to bond metal surfaces, e.g., aluminum, titanium, stainless steel, carbon steel, and copper and copper cladding. The resulting cured epoxy resin could also be used as a structural adhesive and as a prepreg with the metal surfaces described above. Another use of the resulting epoxy resin cured with the above-described curing agents is as an adhesive for sandwich or honeycomb-type structures. These structures could be made of metallic materials, such as those described above, or of nonmetallic materials. Epoxy resins cured by the above-described chlorinated aromatic diamines would also be useful in filament windings and tape prepregs. The high glass transition temperature after exposure to high humidity, and the excellent resistance to the plasticizing effects of moisture should also prove useful to the design of superior performance structures as in airplanes, aircraft missiles, and other aerospace and high-speed applications.

DESCRIPTION OF THE PREFERRED EMBODIMENT

The chlorinated aromatic diamines of this invention have been used in stoichiometric amounts with highly functional epoxy resins based on polyglycidyl derivatives of phenolic or anilino compounds. Specifically the glycidyl and diglycidyl ethers of these compounds in stoichiometric amounts have produced heat-curable epoxy resins which have superior resistance to moisture in terms of weight gain and glass transition temperature after moisture exposure. Examples of these compounds are the diglycidyl ether of bisphenol A and its homologs, and the glycidyl ethers of glycerol, bisphenol F and tetrakis (hydroxy phenyl) ethane. The chlorinated aromatic diamines of this invention may also find use with epoxylated novolacs, for example, the resins from phenol-formaldehyde condensates and epichlorohydrin described in British Pat. No. 746,824.

The reaction of the chlorinated aromatic diamines with the epoxy resins is not entirely known. Therefore the inventor does not wish to be limited by any theory. However, as an aid to understanding the general reaction of the amine with the epoxy groups, the following explanation is offered. Each primary amine group is theoretically capable of reacting with two epoxy groups. Upon the reaction of one primary amine group with an epoxy group, a secondary amine is formed. This secondary amine may then react with another epoxy group to form a tertiary amine. Finally as the epoxy groups are opened up hydroxyl groups are formed. These in turn may react with remaining epoxy groups. Although the reaction of hydroxyls so formed with remaining epoxy groups is present, the principal reaction should be that of the primary amine to form a secondary amine, and the subsequent re-reaction with another epoxy group to form a tertiary amine. As already stated, the effect of the benzene ring should be to tightly crosslink into the cured structure. The effect of the chloro groups appears to be to stabilize the primary amines before reaction with the epoxy groups.

Eutectic blends and complexes of 4-chloro, 1,2-benzene diamine have been used as curing agents for epoxide resins. See, e.g., U. S. Pat. Nos. 2,891,927 and 3,600,362 respectively. These patents are incorporated herein by reference. The compounds I have discovered as useful for curing epoxide resins are superior because there is at least one chloro group for each amine group. As described above, the effect of the chloro group appears to be as a stabilizer for the diamine group. Also, the amine groups in 1,3- and 1,4-benzene amine would appear to have a greater tendency to act independently of each other. Identical groups which are ortho to each other in the benzene ring, that is, 1,2-benzene amine, may have a tendency to at least partially block the other group. Alternatively, the ortho amine groups may form a cyclic structure with the release of hydrogen. The resulting cyclic diamine may then react with only one epoxy group. Finally, the chlorinated benzene diamines I have discovered are preferably used in their solid form. The improved moisture resistance and high glass transition temperatures are the result of the chloro groups inherently contributing to the crosslinking of the benzene diamine with the epoxide resin. Their usefulness, therefore, is not dependent on being mixed into a eutectic blend or combined in a complex. That is, the useful chemical properties of these compounds is inherent in the compound itself. It is to be understood, however, that the chlorinated benzene diamine compounds I have discovered as useful curing agents to improve the epoxide resins would also show superior results if they were mixed as eutectic blends with each other.

The chlorinated benzene diamines I have discovered have the following generic formula:

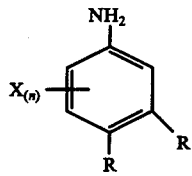

wherein one R is an amino group and the other is halogen; X is chlorine and $n$ is an integer of from 1 to 3. The curing agent is useful in an amount of about 1 to 100 parts by weight per 100 parts of said epoxide resin. For most epoxide resins, the curing agent in an amount of 10 to 70 parts by weight per 100 parts of said epoxide resin will effect the cure. Therefore, the use of the curing agent in this range is preferred for most applications.

It is to be understood that other halogenated benzene diamines with this generic formula may be useful as curing agents for epoxy resins. For example, bromine or fluorine may be substituted for chlorine in the above-described formula.

This invention is limited to epoxide resins containing on average more than one 1,2 epoxide groups per molecule. By 1,2 epoxide groups is meant a group consisting of an oxygen atom bonded to 2 carbon atoms united by a single bond. Ethylene oxide is the basic molecule containing a 1,2 epoxide group. By the term epoxide resin is meant any molecule containing more than one 1,2 epoxide group which is capable of being converted by curing to a useful thermoset form. The epoxide resin may contain the 1,2 epoxide group either internally, terminally, or on a cyclic structure. The term is used to indicate the epoxide resins in both the thermoplastic, that is, uncured and thermoset, that is, cured state.

Examples of 1,2 epoxide groups per molecule which may be used in this invention are terminal 1,2 epoxyethyl groups and 1,2 epoxypropyl groups. These groups may be attached to the epoxide resin by being directly attached to an oxygen, nitrogen or sulfur atom.

Examples of epoxide resins which could be used to practice this invention are polyglycidyl ethers derived from mononuclear phenols, such as resorcinol, catechol, and hydroquinone. The polyglycidyl ethers may also be obtained from polynuclear phenols, such as bis(p-hydroxyphenyl) methane, bis(p-hydroxyphenyl) sulfone, 1,1,2,2-tetrakis(p-hydroxyphenyl) ethane, 2,2-bis(p-hydroxyphenyl) propane, also known as bisphenol A, and 2,2-bis(3,5-dibromo-4-hydroxyphenyl) propane. Polynuclear phenols which could also be used are novolacs formed from aldehydes such as formaldehyde, acetaldehyde, chloral, or furfuraldehyde, with phenols such as phenol itself, p-chlorophenol, o-cresol, p-cresol, and p-tert. butylphenol.

These polyglycidyl ethers may also be obtained from acyclic alcohols such as ethylene glycol, diethylene glycol, triethylene glycol, and higher polyoxyethylene glycols. Cycloaliphatic alcohols may also be used such as resorcitol, quinitol, and 2,2-bis(4-hydroxycyclohexyl) propane. Finally, the ethers may be obtained from alcohols having aromatic nuclei, such as N,N-bis(2-hydroxyethyl) aniline and p,p'-bis(2-hydroxyethylamino) diphenyl methane.

The preferred epoxide resins are polyglycidyl ethers of polyhydric phenols. Also preferred are epoxide resins wherein the epoxide groups are 1,2 epoxypropyl groups directly attached to oxygen, nitrogen or sulfur. Examples of these preferred latter type compounds are: polyglycidyl ether of tris/hydroxyphenyl/methane, tetra N-glycidyl derivative of methylene dianiline, polyglycidyl ether of a novolac resin, diglycidyl ether of bisphenol A, and triglycidyl derivative of aminophenol.

The preferred epoxide resins of this invention may contain a copolymer or an additional thermoplastic polymer which is unreactive to but miscible with the epoxide resin. An example of a thermoplastic polymer which could be used is a phenoxy resin. The phenoxy resin must be free from 1,2 epoxide groups and have an average molecular weight of at least 10,000. An example of this type of resin is linear polyarylene polyhydroxy polyether, and its derivatives. Generally, copolymers of a dihydric phenol with diglycidyl ether of a dihydric phenol or with epichlorohydrin may be used.

The epoxide resins of this invention may also contain fillers which are unreactive with the 1,2 epoxide groups. Examples of such commercial fillers are aluminum silicate, calcium carbonate, magnesium silicate, ceramic zircon, aluminum powder, tabular alumina, kaolinite, bentonite, mica, silica, zirconium silicate, and hydrated alumina. In addition, powdered metals such as aluminum may be used. The filler may be added either in advance to the epoxide resin or in situ with the addition of the curing agent.

Coloring agents, such as pigments and dyes may also be used. Generally, organic pigments and dyes are preferred because of their brightness and strength. Examples of these colorants could be titanium dioxide, carbon black, cadmium red, Hansa yellow, phthalocyanine blue and phthalocyanine green.

Thixotropic agents, such as finely divided silica or amine modified clays may also be added to the epoxide resin either in advance or in situ with the curing agent.

Finally, non-reactive diluents may be added to impart special properties to the epoxide resins. For example, polymethyl acetals may be added to improve adhesive strength at room curing temperatures. Also, 4,4-dimethyl-5-hydroxymethyl methylmetadioxane may be useful to improve tensile strength. Examples of other non-reactive diluents could be dibutyl phthalate and monomeric styrene.

To retard or incapsulate the curing agent for release by heat or an adsorbable compound, crystalline metal alumino silicates (generally known as molecular sieves or zeolites) may be used with the curing agent. When the curing agent is loaded with the zeolite, the release may be by heat or by the use of a zeolite adsorbable compound, or both.

It is to be understood that the properties obtained with the epoxide resins cured with the chlorinated benzene diamines of this invention may be modified by the use of the above-described additives.

In referring to the examples, the following description is pertinent:

Epoxide resin A is a polyglycidyl ether of tris-(hydroxyphenyl)methane prepared at a mixing temperature of between about 100° to 150° C. An example of this resin is XD 7342 supplied by Dow Chemical Company.

Epoxide resin B refers to a tetra N-glycidyl derivative of methylene dianiline which was prepared at a mixing temperature of between about 100° to 150° C. An example of this resin is MY 720 supplied by Ciba-Geigy Company.

Epoxide resin C refers to a polyglycidyl ether of a novolac resin prepared at a mixing temperature of about 100° C. An example of this type of resin is DEN 438 supplied by the Dow Chemical Company.

Epoxide resin D refers to a diglycidyl ether of bisphenol A prepared at a mixing temperature of about 100° C. An example of this resin is DER 331 supplied by Dow Chemical Company.

The glass transition temperature was determined by thermomechanical analysis using a DuPont dilatometer. The rate of temperature rise was at 2° C. per minute. The elongation in inches was plotted against the temperature in degrees centigrade.

The invention is more fully described in the examples which follow. These examples are preferred embodiments of the invention and should not be construed as limitations thereon.

EXAMPLE 1

The following illustrates the glass transition temperature, the excellent glass transition temperature after 24 hours boil, and percent moisture pickup of Resin A cured with chlorinated benzene diamine. The resin is prepared by dissolving the powdered chlorinated benzene diamines listed in the table below into the resin at the mixing temperatures listed in the table below. The solution is then stirred until the powdered chlorinated benzene diamine is dispersed or dissolved into the resin. This solution or dispersion is then cast into a mold. Two curing cycles were conducted. The first cycle was for 2 hours at 177° C. The glass transition temperature, the glass transition temperature after a 24 hour water boil, and the percent moisture pickup was then determined. The resin was then post cured for 2 hours at 204° C. and the above determinations were again taken.

Results are as follows. All mixing temperatures are at 100° C. unless otherwise noted.

Table 1

| Curing Agent | Mix Ratio[1] | Tg, ° C | Tg, 24 hr.[2] ° C. | % Moisture[3] |
|---|---|---|---|---|
| Control[4] | 100/38[5] | a[6] 199 | 152 | 2.1 |
|  |  | b[6,7] 247 | 156 | 2.6 |
| 2,6-dichloro, 1,4-benzene diamine | 100/28 | a 230 | 189 | 1.8 |
|  |  | b 270 | 212 | 2.0 |
| 2,5-dichloro, 1,4-benzene diamine | 100/28[5] | a 231 | 180 | 1.7 |
|  |  | b 248 | 197 | 1.8 |
| 2,3-dichloro, 1,4-benzene diamine | 100/28 | a 224 | 184 | 1.8 |
|  |  | b 256 | 209 | 1.9 |
| 2,3,5-trichloro, 1,4-benzene diamine | 100/32[5] | a 238 | 180 | 1.6 |
| 4,6-dichloro, 1,3-benzene diamine | 100/28 | a 223 | 164 | 1.7 |
|  |  | b 234 | 178 | 1.8 |

[1]phr,
[2]24 hr. = 24 hour water boil using deionized water at ambient pressure.
[3]measured after Tg, 24 hour.
[4]U.S. 3,155,743, Cf. Eporal 40®, Ciba-Geigy Co., N.J.
[5]Mix Temperature, 150° C
[6]Cure, 2 hrs. at 177° C
[7]Postcure, 2 hrs. at 204° C.

EXAMPLE 2

The following illustrates the curing affect of chlorinated 1,3- and 1,4-benzene diamines with Resin B.

Example 1 was repeated except the resin used was Resin B.

Results are as follows. The mix temperature was 100° C. except where noted.

Table 2

| Curing Agent | Mix Ratio[1] | Tg, ° C | Tg, 24 hr.[2] ° C | % Moisture[3] |
|---|---|---|---|---|
| Control[4] | 100/49[5] | a[6] 225 | 140 | 2.1 |
|  |  | b[6,7] 248 | 144 | 2.6 |
| 2,6-dichloro, 1,4-benzene diamine | 100/36 | a 228 | 175 | 1.7 |
|  |  | b 247 | 182 | 1.8 |
| 4,6-dichloro, 1,3-benzene diamine | 100/36 | a 224 | 144 | 1.7 |

[1]phr.
[2]24 hr. = 24 hour water boil using deionized water at ambient pressure.
[3]measured after Tg, 24 hr.
[4]U.S. 3,155,743, Cf. Eporal 40®, Ciba-Geigy Co., N.J.
[5]Mix Temperature, 150° C
[6]Cure, 2 hrs. at 177° C
[7]Postcure, 2 hrs. at 204° C.

EXAMPLE 3

The following illustrates the excellent glass transition temperature and percent moisture pickup for Resin C.

Example 1 was repeated except the resin used was Resin C.

Results are as follows. Mix temperatures are at 100° C. except where noted.

Table 3

| Resin C Curing Agent | Mix Ratio[1] | Tg, °C | Tg 24 hr.[2] °C | % Moisture[3] |
|---|---|---|---|---|
| Control[4] | 100/35[5] | a[6] 224 | 141 | 1.7 |
|  |  | b[6,7] 250 | 154 | 1.8 |
| 2,6-dichloro, 1,4-benzene diamine | 100/25 | a 212 | 155 | 1.6 |
|  |  | b 243 | 195 | 1.6 |

[1] phr.
[2] 24 hr. = 24 hour water boil using deionized water at ambient pressure.
[3] measured after Tg, 24 hr.
[4] U.S. 3,155,743, Cf. Eporal 40®, Ciba-Geigy Co., N.J.
[5] Mix Temperature 145° C
[6] Cure, 2 hrs. at 177° C
[7] Postcure, 2 hrs. at 204° C.

EXAMPLE 4

The following illustrates the superior glass transition temperature, glass transition temperature after 24 hour boil, and percent moisture pickup for Resin D.

Example 1 was repeated except the resin used was resin D.

Results are as follows. The mix temperature is 100° C. except where otherwise noted.

Tble 4

| Resin D Curing Agent | Mix Ratio[1] | Tg, °C | Tg 24 hr.[2] °C | % Moisture[3] |
|---|---|---|---|---|
| Control[4] | 100/33[5] | a[6] 187 | 125 | 2.0 |
| 2,6-dichloro 1,4-benzene diamine | 100/24 | a 186 | 130 | 1.5 |

[1] phr.
[2] 24 hr. = 24 hour water boil using deionized water at ambient pressure.
[3] measured after Tg, 24 hr.
[4] U.S. 3,155,743, Cf. Eporal 40®, Ciba-Geigy Co., N.J.
[5] Mix Temperature, 145° C
[6] Cure, 2 hrs. at 177° C

I claim:

1. A curable epoxide composition comprising: (a) an epoxide resin containing on average more than one 1,2 epoxide groups per molecule, (b) a curing agent for the epoxide resin of the formula:

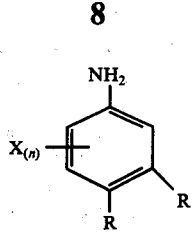

wherein one R is an amino group and the other is chlorine; X is chlorine and $n$ is an integer of from 1 to 3, said curing agent being present in an amount between about 1 to 100 parts by weight per 100 parts by weight of said epoxide resin.

2. A composition described in claim 1 wherein the epoxide resin is a polyglycidyl ether of a polyhydric phenol.

3. A curable composition described in claim 1 wherein said epoxide groups are 1,2 epoxypropyl groups directly attached to an oxygen, nitrogen or sulfur atom.

4. A composition according to claim 3 wherein the epoxide resin is selected from the group consisting of polyglycidyl ether of tris(hydroxyphenyl)methane, tetra N-glycidyl derivative of methylene dianiline, polyglycidyl ether of a novolac resin, diglycidyl ether of bisphenol A, and triglycidyl derivative of aminophenol.

5. A curable composition described in claim 1 wherein the curing agent (b) is present in from about 10 to 70 parts by weight per 100 parts of said epoxide resin.

6. A curable composition described in claim 1 wherein the curing agent (b) is dispersed in particulate form into said epoxide resin.

7. A curable composition described in claim 1 wherein the curing agent (b) is dissolved in said epoxide resin.

8. A curable composition according to claim 1 wherein the epoxy resin is the diglycidyl ether of bisphenol A and the curing agent is 2,6-dichloro-1,4-benzene diamine.

* * * * *